United States Patent
Smirnov

(10) Patent No.: US 10,956,692 B2
(45) Date of Patent: Mar. 23, 2021

(54) TAG READER RECEIVER WITH HIGH-Q ANTENNA

(71) Applicant: Geissler Companies, LLC, Minneapolis, MN (US)

(72) Inventor: Yuri Smirnov, Eagan, MN (US)

(73) Assignee: GEISSLER COMPANIES, LLC, Minneapolis, MN (US)

( * ) Notice: Subject to any disclaimer, the term of this patent is extended or adjusted under 35 U.S.C. 154(b) by 0 days.

(21) Appl. No.: 16/697,210

(22) Filed: Nov. 27, 2019

(65) Prior Publication Data

US 2020/0167533 A1 May 28, 2020

Related U.S. Application Data

(60) Provisional application No. 62/771,901, filed on Nov. 27, 2018.

(51) Int. Cl.
*G08B 21/00* (2006.01)
*G06K 7/10* (2006.01)
*G06K 7/00* (2006.01)

(52) U.S. Cl.
CPC ....... *G06K 7/10366* (2013.01); *G06K 7/0008* (2013.01); *G06K 7/10148* (2013.01)

(58) Field of Classification Search
CPC ........... G06K 7/10366; G06K 7/10148; G06K 7/0008; H04B 5/0062
USPC ..................................................... 340/572.1
See application file for complete search history.

(56) References Cited

U.S. PATENT DOCUMENTS

| | | |
|---|---|---|
| 6,353,406 B1 | 3/2002 | Lanzl et al. |
| 7,567,626 B2 | 7/2009 | Hammes et al. |
| 8,274,372 B2 | 9/2012 | Fujino |
| 8,285,214 B2 | 10/2012 | Sadeghfam et al. |
| 8,493,185 B2 | 7/2013 | Bateman |
| 8,525,676 B2 | 9/2013 | Yasui et al. |
| 9,076,119 B2 | 7/2015 | Jain et al. |
| 9,141,836 B2 | 9/2015 | Domokos et al. |
| 2006/0022815 A1 | 2/2006 | Fischer et al. |
| 2007/0273519 A1* | 11/2007 | Ichikawa ............... B41J 3/44 340/572.1 |
| 2008/0136645 A1* | 6/2008 | Lin .................. G06K 7/0008 340/572.4 |
| 2008/0198903 A1* | 8/2008 | Kawai ................ H04B 1/0028 375/135 |

(Continued)

FOREIGN PATENT DOCUMENTS

| | | |
|---|---|---|
| EP | 2648131 A1 | 10/2013 |
| JP | 04531094 B2 | 8/2010 |
| WO | 2012158840 A1 | 11/2012 |

OTHER PUBLICATIONS

STMicroelectronics NV, AN4974 Application note, "Antenna matching for ST25R3911B/ST25R391x devices," Rev. 2, www.st.com, 44 pages, Oct. 2017.

(Continued)

*Primary Examiner* — Mark S Rushing
(74) *Attorney, Agent, or Firm* — Cozen O'Connor

(57) ABSTRACT

Radio-frequency transmission and reception circuitry is adapted for use with a high-quality-factor antenna. On the transmission side, control circuitry is provided to maintain resonance at the transmission frequency. On the reception side, multiple receive paths are independently controllable for temporal and amplitude alignment.

18 Claims, 7 Drawing Sheets

(56) References Cited

U.S. PATENT DOCUMENTS

| | | | |
|---|---|---|---|
| 2011/0140863 A1* | 6/2011 | Shingai | G06K 19/0701 340/10.6 |
| 2011/0156907 A1* | 6/2011 | Nagai | G06K 17/00 340/572.1 |
| 2014/0015647 A1* | 1/2014 | Domokos | G06K 7/0008 340/10.1 |
| 2017/0124790 A1 | 5/2017 | Sample | |

OTHER PUBLICATIONS

Shahmohammadi et al., "High-Q, Over Coupled Tuning for Near-Field RFID Systems," Disney Research, 8 pages.
Atmel, ATA5276 125 kHz Transmitter IC for TPM, Jan. 2007, 19 pages.
Arthur B. Williams et al. "Electronic Filter Design Handbook," 4th Ed., ISBN 0-07-147171-5, McGraw-Hill, Jun. 9, 2006, 782 pages.

\* cited by examiner

TAG READER RECEIVER WITH HIGH-Q ANTENNA

PRIORITY

This application claims the benefit of priority of U.S. Patent Application Ser. No. 62/771,905, filed on Nov. 27, 2018, which is hereby incorporated by reference herein.

TECHNICAL FIELD

Embodiments described herein generally relate to electronics and wireless communications and, more particularly, to high-quality-factor (high-Q) resonant circuitry for driving and reading communications devices.

BACKGROUND

A radio-frequency identification (RFID) reader generates electromagnetic fields to energize and interrogate a RFID tag or other compatible communications device located within communication range of the reader. The RFID tag may use the energy supplied by the reader's driving signal, or another source of power, to communicate information to the reader using RF signaling. RFID has found applications in a wide variety of areas, including asset tracking, security, supply chain logistics, manufacturing, testing and measurement, and myriad others.

In one type of application, biocompatible RFID tags have been proposed for use with implantable medical devices for transcutaneous communication. These types of applications present several notable challenges to system designers. For one, the body tends to absorb and attenuate RF signals, particularly high-frequency RF signals, which are able to carry higher bandwidths. In addition, the transmit power of RFID readers for use in implantable-tag applications is often limited for safety reasons. Since an implanted tag is not visible in the absence of imaging instruments, achieving an optimal positioning and alignment between the reader and the tag can be particularly difficult. Moreover, some patients, such as children or animals, tend to have difficulty keeping still during reading of the tag. These challenges compound to make RFID-based implantable sensors difficult to implement in practice.

Related challenges may be found in other applications. For example, underwater environments, longer-range reading, and RFID reading in RF-noisy environments, each exacerbate the difficulty of reliably reading RFID tags.

High quality-factor (Q) radio circuitry has been proposed for use in RFID systems. High-Q radio communications use a specially-designed antenna and radio front end circuitry to emit a particularly strong RF field for a given transmit power, in a narrow frequency band, using principles of electromagnetic resonance. High-Q RFID readers and tags can improve communications performance in environments where distance, signal attenuation, or interference may pose challenges.

However, high-Q systems also introduce particular challenges of their own. For instance, a high-Q transmitter in a RFID reader may overload the tag. Also, the use of a high-Q antenna limits the bandwidth, and corresponding data rate, that may be transmitted effectively. In addition, a high-Q system tends to be very sensitive to frequency deviations and instability. Moreover, high-Q RF communication systems tend to suffer from group delay, where different frequencies experience different amounts of time delay in the receiver.

Solutions are needed to address these, and other, challenges in RFID reading applications.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are generally directed to high-Q radio communications technology. As discussed above, there are numerous applications in the field of RFID where high-Q RFID readers may be employed, including in transcutaneous measurement or communications with implantable devices. Likewise, high-Q RFID readers may be used in other RFID applications that may benefit from the advantages afforded by the high-Q operational characteristics. It should also be noted that principles of the embodiments are applicable to RF-communications applications outside the sphere of RFID. For example, telemetry and data collection, measurement and process control, networking, and many other applications, may benefit from aspects of the embodiments. Accordingly, the scope of the claims should not be limited to any particular application or embodiment unless such a limitation is expressly stated in those claims.

Figure 1:
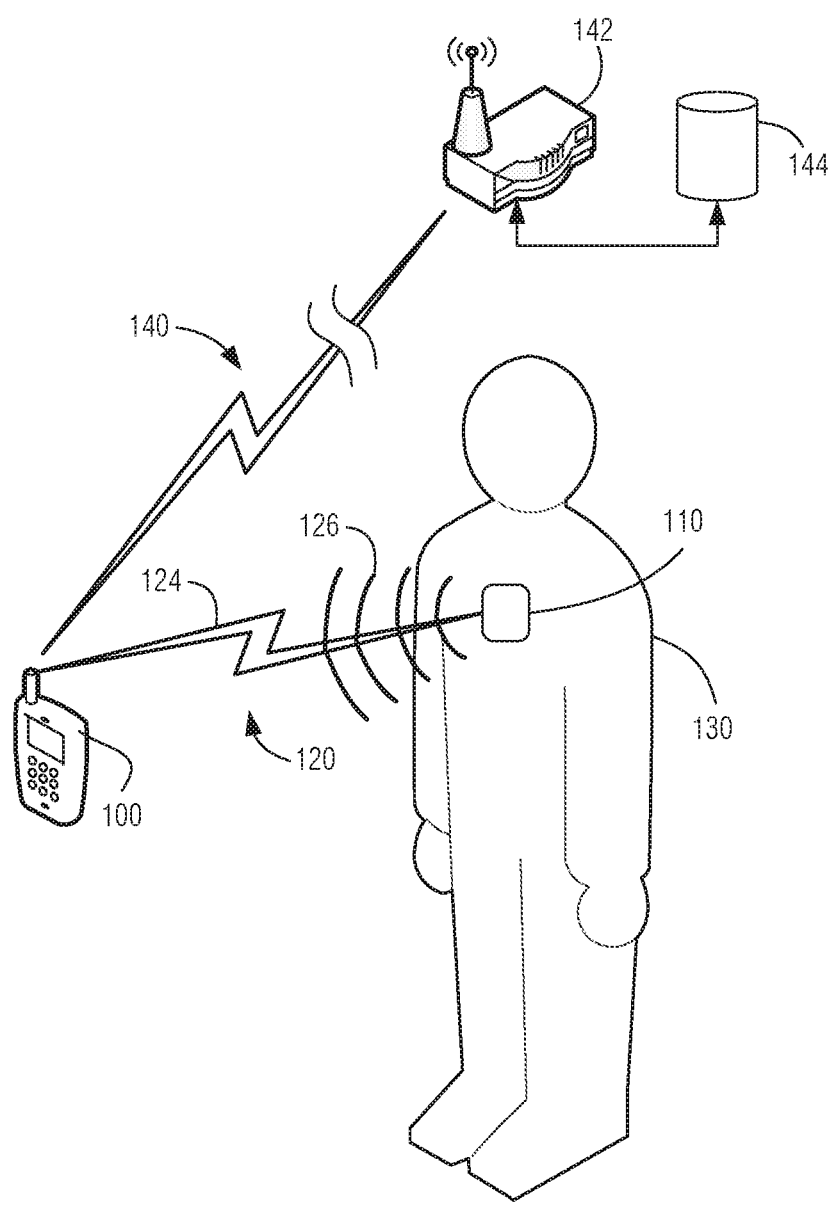
FIG. 1 is a diagram illustrating a use case scenario of a RFID reader communicating with a RFID tag via RFID signaling according to examples of the embodiments.

FIG. 1 is a diagram illustrating an example use case scenario of a RFID reader 100 communicating with RFID tag 110 via RFID signaling 120. RFID tag 110 in this example is implanted in patient 130. RFID signaling 120 may be adapted for passive RFID tag reading, or active RFID tag reading. Passive RFID reading uses RFID tag 110 that does not have a power source apart from reader 100. In active RFID reading, tag 110 has a power source apart from any driving signal.

In the passive RFID tag case, RFID signaling 120 includes transmission of driving signal 124 by RFID reader 100, which powers RFID tag 110 to enable the latter to transmit information signal 126. Information signal 126 may be a static tag ID signal, or it may be a variable-information signal such as a sensor reading, for instance.

In the active RFID tag case, RFID driving signaling 124 may be either included in, or omitted from, RFID signaling 120. In some active RFID examples, driving signal 124 is replaced by a lower-power interrogation signal that prompts RFID tag 110 to transmit information signal 126. In other examples, RFID tag 110 independently transmits information signal 126 periodically or continuously, without being prompted.

According to various embodiments, RFID signaling 120 is facilitated by high-Q antenna and resonant (e.g., tank) circuitry. In some implementations, driving signal 124 is a narrowband transmission having a bandwidth of 1 kHz at a carrier frequency of 134. In related implementations, information signal 126 is narrowband transmission having a bandwidth of 2 kHz at a carrier frequency of 134 kHz. In the present context, high-Q antenna and associated transmission circuitry means a quality factor Q of at least 100.

In related embodiments, as depicted, RFID reader 100 is configurable to communicate with remote receiver 142 via long-distance RF signaling 140. Remote receiver 142 may be used to receive results or data collected via RFID signaling 120. Data for multiple instances of RFID tag readings may be collected and stored in database 144 coupled to remote receiver 142. The multiple RFID tag readings may correspond to one, or multiple different, RFID tags.

In some embodiments, long-distance RF signaling 140 is facilitated by the same RF hardware components as RFID signaling 120. Given the greater transmission range to be achieved for long-distance RF signaling 140, along with increased interference noise in the communication channel to be managed, the transmission circuitry may vary the depth of modulation, transmission power, or both, compared to the driving signal power for transmission of RFID signaling 120. For instance, long-distance RF signaling 140 may utilize at least 100 times the transmission power of RFID signaling 120.

Figure 2:
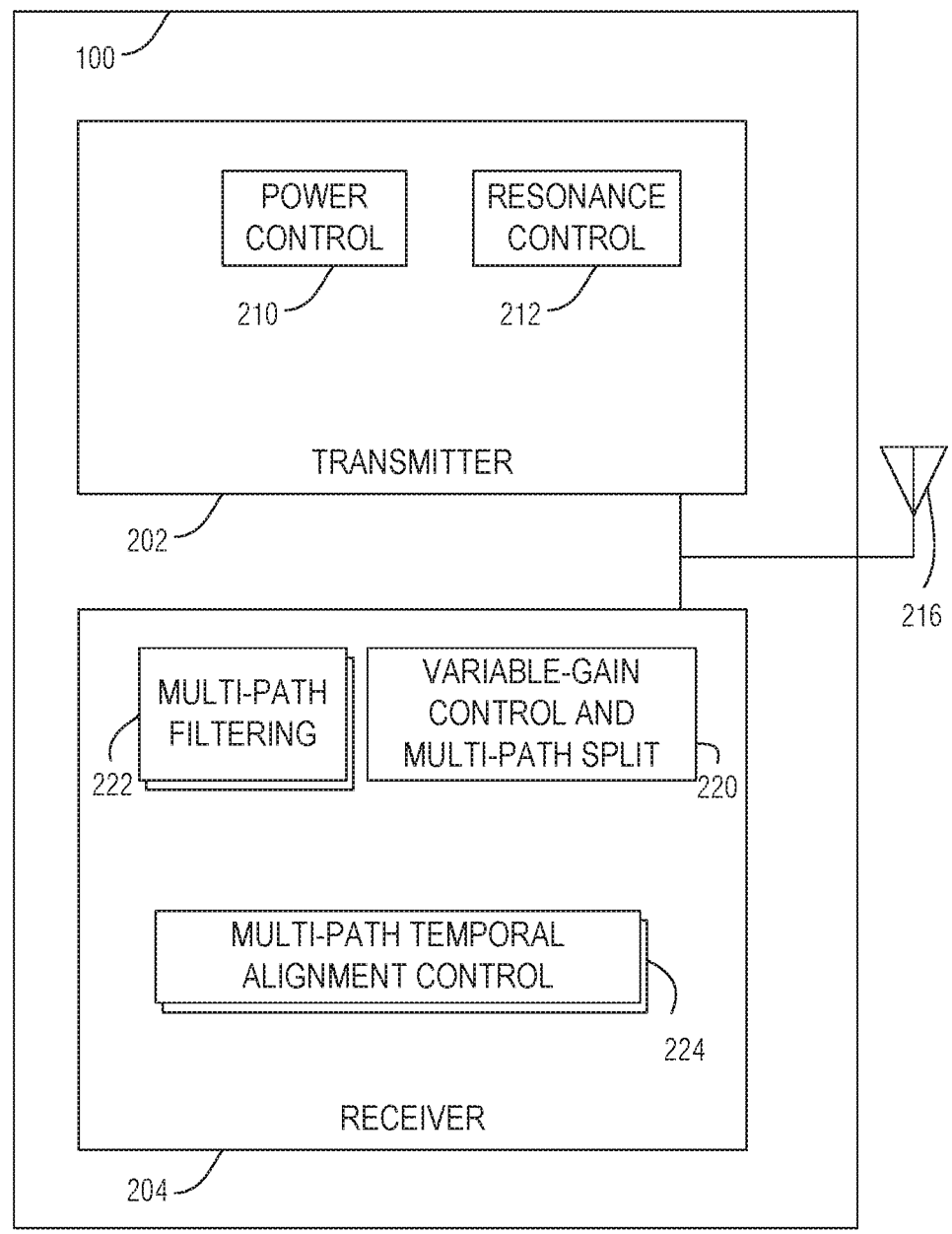
FIG. 2 is a simplified, high-level, block diagram illustrating certain portions of a RFID reader according to some example embodiments.

FIG. 2 is a simplified, high-level, block diagram illustrating certain portions of RFID reader 100 according to some example embodiments. It will be understood that RFID reader 100 may have additional subsystems that are omitted from the example depicted in FIG. 2 for the sake of clarity. As depicted, RFID reader 100 includes transmitter circuit 202 and receiver circuit 204. Transmitter circuit 202 includes power control subcircuit 210, and resonance control subcircuit 212.

Power control subcircuit 210 is constructed to dynamically adjust the transmission power to correct for variations in the signal propagation path that affect the signal strength of the transmitted signal. Examples of such variations include variations in signal transmission distance, variation in positioning relative to a RFID tag or remote receiver, movement or introduction of obstructions such as reflective objects, variation of the dielectric properties of the space through which the signal propagates (e.g., moisture), or the like. Resonance control subcircuit 212 is constructed to adjust the transmission circuit impedance to establish or maintain resonance at the carrier frequency of the transmitted driving signal 124. In some examples, as described in greater detail below, the carrier frequency of driving signal 124 may remain fixed while various environmental variations may affect the resonance characteristics of the system; accordingly, resonance control subcircuit 212 may advantageously correct for the environmental variations.

High-Q antenna 216 is coupled to transmitter circuit 202, as well as to receiver circuit 204. In another embodiment (not shown), separate high-Q antennas are provided for transmitter circuit 202 and receiver circuit 204.

Receiver circuit 204 includes variable-gain control and multi-path split subcircuit 220, multi-path filtering subcircuitry 222, multi-path temporal alignment control subcircuitry 224, and high-dynamic-range (HDR) sense signal conditioner subcircuitry 226 according to the example depicted. Variable-gain control and multi-path split subcircuit 220 is constructed to amplify and dynamically adjust the received baseband signal gain to produce a baseband signal within a defined range for further signal conditioning, and to split the amplified received baseband signal into multiple parallel paths. Multi-path filtering subcircuitry 222 includes independent bandpass filtering in each of the multiple parallel paths. Multi-path temporal alignment control subcircuitry 224 includes all-pass filtering, independently in each of the parallel paths, to adjust the respective group delays. Multi-path temporal alignment control subcircuitry 224 produces multiple received data signals having the substantially matched amplitude and group delay.

Figure 3:
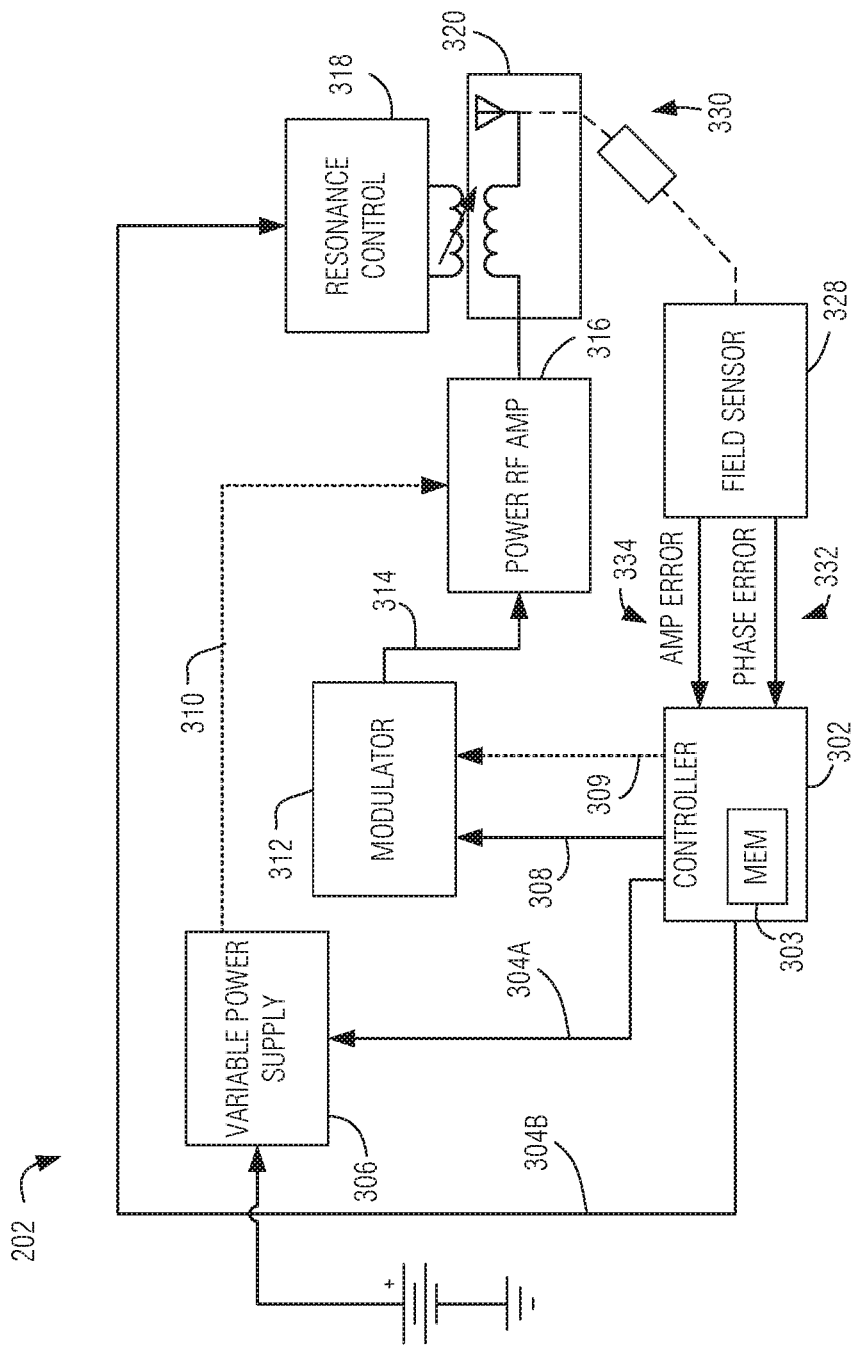
FIG. 3 is a block diagram illustrating a transmitter circuit portion of the RFID reader of FIG. 2 in greater detail according to an example embodiment.

FIG. 3 is a block diagram illustrating transmitter circuit 202 in greater detail according to an example embodiment. Controller 302, which may be implemented using a microprocessor, a digital signal processor (DSP), a field-programmable gate array (FPGA), or the like, oversees and dynamically adjusts the operation of the various components of transmitter circuit 202. Controller 302 supplies transmit power control signaling 304A to variable power supply 306, and resonance control signaling 304B to resonance control circuit 318. Controller 302 also supplies data stream 308, and modulation control signal 309 to modulator 312. Controller 302 includes memory 303 allocated to store ID numbers of known RFID tags, which may be individually addressed or interrogated using RFID signaling 120.

Variable power supply 306 produces variable supply power 310 for use by power RF amplifier 316 to produce driving signal 124. Variable supply power 310 is dynamically adjusted in response to power control signaling 304A.

In related embodiments, controller 302 selectively controls generation of modulated RF signal 314 for transmission to remote receiver 142, or RFID tag 110 (FIG. 1). Accordingly, controller 302 issues power control signaling 304A for variable power supply 306 to call for diverse supply power provision. In some embodiments, variable supply power 310 may be adjusted from less than 10 V to more than 50 V. In related embodiments, variable supply power may be adjusted from less than 10 V to more than 100 V. As an example, variable supply power may be adjusted from less than 10 V to more than 150 V. As another example, variable supply power may be adjusted from less than 10 V to more than 200 V. Since power is proportional to the square of the voltage, variable power supply 306 facilitates transmission power variation by factors of 100, 500, 1000, or more.

Modulator 312 modulates a RF carrier wave using data stream 308 to produce modulated RF signal 314, which is fed to power RF amplifier 316. In a related embodiment, the modulation depth of modulated RF signal 314 is dynamically varied according to modulation control signal 309. Modulator 312 may apply a suitable analog or digital modulation technique such as, for example, amplitude modulation (AM), phase modulation (PM), frequency modulation (FM), amplitude shift keying (ASK), phase shift keying (PSK), frequency shift keying (FSK), quadrature amplitude modulation (QAM), or any variant or combination of one or more of these techniques, such as binary phase shift keying, quadrature phase shift keying, on-off keying, etc.

Power RF amplifier 316 amplifies modulated RF signal 314 based on the level of variable supply power 310, to produce driving signal 124, which is fed to high-Q resonant antenna 320. The use of variable supply power 310 allows power RF amplifier 316 to vary the amplitude of driving signal 124 over a wide range (e.g., from less than 10 volts to hundreds of volts, as discussed above). Variation of supply power 310 may be performed to maintain a relatively stable emitted electromagnetic field in continuously-changing conditions (such as, for example, as the spacing between the RFID reader and the RFID tag 110 varies), or for different selectable signal recipients (e.g., remote receiver 142), which may be located at substantially different distances from RFID reader 100.

Resonance control circuit 318 adjusts the reactance of high-Q resonant antenna 320 based on resonance control signaling 304B. As depicted in the example shown in FIG. 3, resonance control circuit 318 may be magnetically coupled to high-Q resonant antenna 320, with a variable magnetic bias. However, any suitable coupling technique (e.g., adjustable capacitive coupling) may be employed. In addition, various other embodiments of resonance control circuit 318 may utilize a variable capacitor arrangement or a combination of variable inductance and variable capacitance to adjust the reactance of the L-C resonant network formed by resonance control circuit 318 and high-Q resonant antenna 320. In an example embodiment, resonance control circuit 318 adjusts the reactance of high-Q resonant antenna 320 by varying a direct current through an inductor to adjust the inductor's magnetic bias.

The resonance frequency of the electromagnetic field depends on the transmission circuitry, which is made variable by resonance control circuit 318, the geometry and reactance of high-Q resonant antenna 320, along with the characteristic impedance of the environment in which the electromagnetic field is to be propagated. As the environmental characteristics may vary (e.g., due to changing positioning of the antenna relative to objects in the vicinity of the emitted field, to a body of a patient (in the case of a biomedical application), to conductive or magnetic materials, or the like, the resonance frequency may vary. Accordingly, in some embodiments, a feedback control system is provided to align the resonance frequency of the electromagnetic field with the carrier frequency of RFID signaling 120 or long-distance RF signaling 140.

In a related type of embodiment, the feedback control system is provided to align the resonance frequency of the electromagnetic field with a sideband frequency near the carrier frequency of RFID signaling 120 or long-distance RF signaling 140. In another related type of embodiment, the feedback control system is provided to align the resonance frequency of the electromagnetic field with a harmonic of the carrier frequency (or sideband near the carrier frequency) of RFID signaling 120 or long-distance RF signaling 140.

Field sensor 328 operates in the feedback loop of the feedback control system according to these embodiments. Field sensor 328 may be coupled to the emitted field itself, with the latter depicted via feedback coupling 330 as one example. Feedback coupling 330 may be capacitive or magnetic according to various approaches that may be taken.

Field sensor 328 produces phase error signal 332 and amplitude error signal 334, each to be provided to controller 302. Each error signal 332, 334 indicates the measured variation from a nominal condition. For instance, at resonance, the phase offset angle is nominally 90 degrees; hence, the phase error signal 332 may represent the difference between the measured phase offset and 90 degrees. Amplitude error signal indicates the difference between the measured electromagnetic field amplitude and an expected nominal value.

In controlling the parameters of driving signal 124, controller 302 adjusts variable power supply 306 with transmit power control signaling 304A in response to amplitude error signal 334 so as to minimize the amplitude error. Likewise, controller 302 adjusts the depth of modulation applied by modulator circuitry 312, via modulation control signal 309, in accordance with the nature of the transmission signal (e.g., whether intended for relatively short-distance communications, or relatively long-distance communications). Controller 302 further adjusts resonance control circuit 318 with resonance control signaling 304B in response to phase error signal 332 so as to minimize the phase error.

Figure 4:
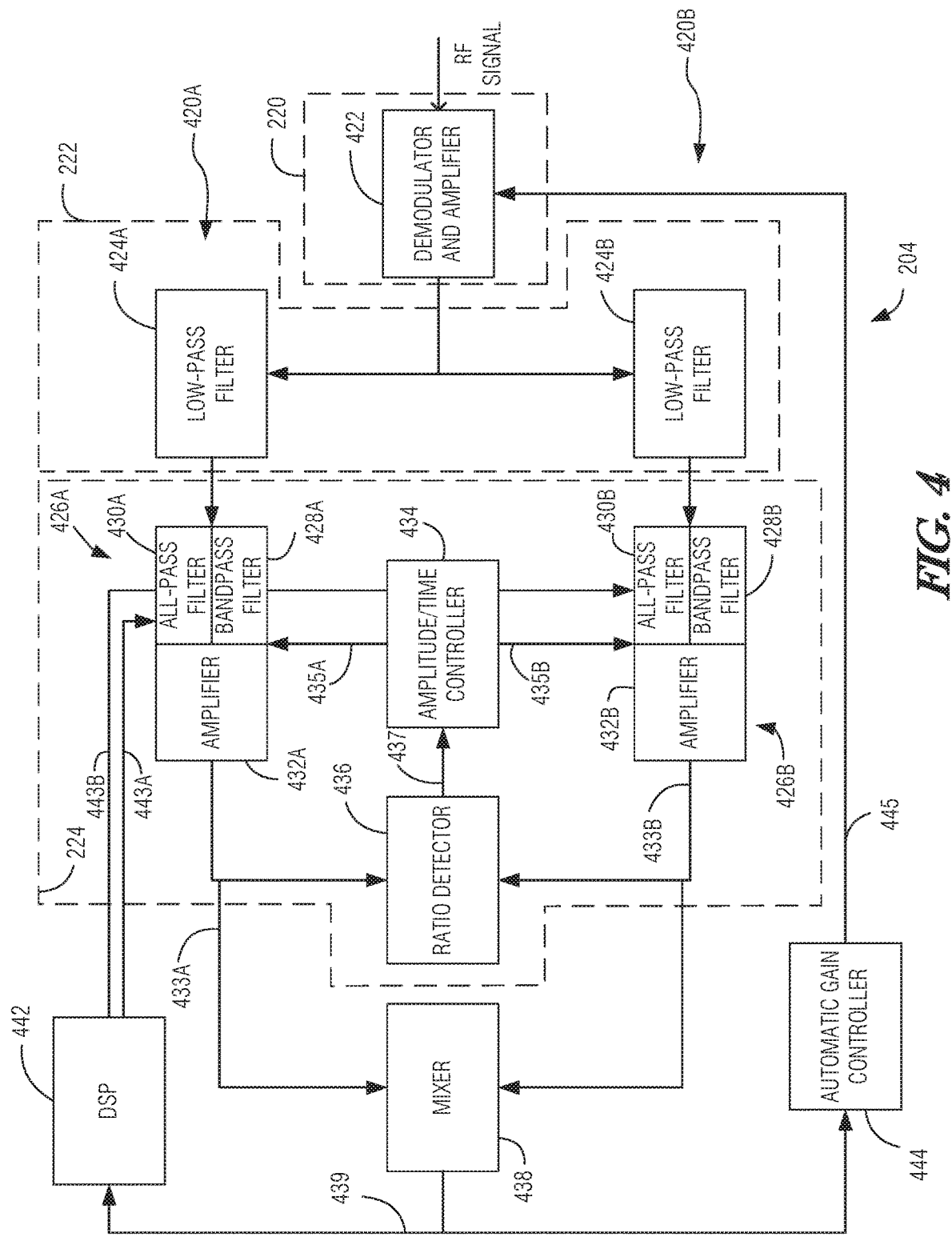
FIG. 4 is a block diagram illustrating an example embodiment of a receiver circuit portion of the RFID reader of FIG. 2 in greater detail according to an example embodiment.

FIG. 4 is a block diagram illustrating an example embodiment of receiver circuit 204. Subcircuitry of receiver circuit 204 includes variable-gain control and multi-path split subcircuit 220, multi-path filtering subcircuitry 222, and multi-path temporal alignment control subcircuitry 224.

Demodulator and amplifier 422 accepts as its input a modulated RF signal. The modulated RF signal may be as received at the high-Q antenna, or it may have been conditioned to some extent (e.g., amplified, filtered, etc.) at this point. The modulated RF signal may have been originated by a RFID tag, or other device in communication with receiver circuit 204.

The modulated RF signal may have a certain bandwidth, or a plurality of baseband frequency components that are modulated onto a RF carrier wave. The bandwidth of the modulated RF signal may exceed the bandwidth of the high-Q antenna of the RFID reader. Additionally, as described in greater detail below, use of the high-Q antenna may tend to complicate the accurate recovery of the baseband signal from received RF signal by imparting group delay and frequency-dependent attenuation, which may distort the demodulated baseband signal.

According to an aspect of the embodiments, receiver circuit 204 includes multiple receive paths. As illustrated, this example has first receive path 420A, and second receive path 420B. Each receive path 420A/B receives the demodulated baseband signal as its input. Each receive path includes low-pass filter 424A/B, which feeds into signal conditioning arrangements 426A/B. Each signal conditioning arrangement 426A/B includes bandpass filter 428A/B, all-pass filter 430A/B, and amplifier 432A/B.

Bandpass filters 428A and 428B are tuned to different center frequencies, which may correspond respectively to different frequency components of the baseband signal. All-pass filters 430A and 430B are individually controllable to apply a specific time delay to its respective receive path 420A/B. Amplifiers 432A and 432B are also individually controllable to apply a specific gain to its respective receive path 420A/B.

The control of all-pass filters 430A/B and amplifiers 432A/B is provided via amplitude/time controller circuit 434, based on feedback supplied by ratio detector 436. Ratio detector 436 compares the temporal alignment and the relative amplitudes of outputs 433A and 433B from respective signal conditioning arrangement 426A/B, and feeds error signaling 437 to amplitude/time controller 434. In turn, amplitude/time controller 434 generates compensation control signaling 435A and 435B respectively to each signal conditioning arrangement 426A/B. As a result of the operation of control loops individually controlling signal conditioning arrangements 426A and 426B, the recovered baseband signaling of each receive path 420A/B is equalized and temporally aligned.

Outputs 433A and 433B from respective signal conditioning arrangement 426A/B are also fed to mixer 438, which combines the outputs from receive paths 420A/B to produce recovered baseband signal 439. Recovered baseband signal 439 is fed to automatic gain controller 444 and digital signal processor (DSP) block 442.

Automatic gain controller 444 compares the amplitude of recovered baseband signal 439 against a target amplitude, and generates amplitude correction signal 445 to adjust the gain of demodulator and amplifier circuitry 422 such that the target amplitude is approached.

DSP block 442 includes analog-to-digital converter (ADC) circuitry (e.g., sampling, quantization, encoding, etc.) and a DSP (e.g., processor core, memory, etc.) that executes signal-processing algorithms to read and interpret recovered baseband signal 439. In some embodiments, DSP 442 generates frequency-selection signaling 443A, 443B, to be respectively provided to all-pass filter 430A and 430B to set or adjust the center frequency subject to delay.

Figure 5:
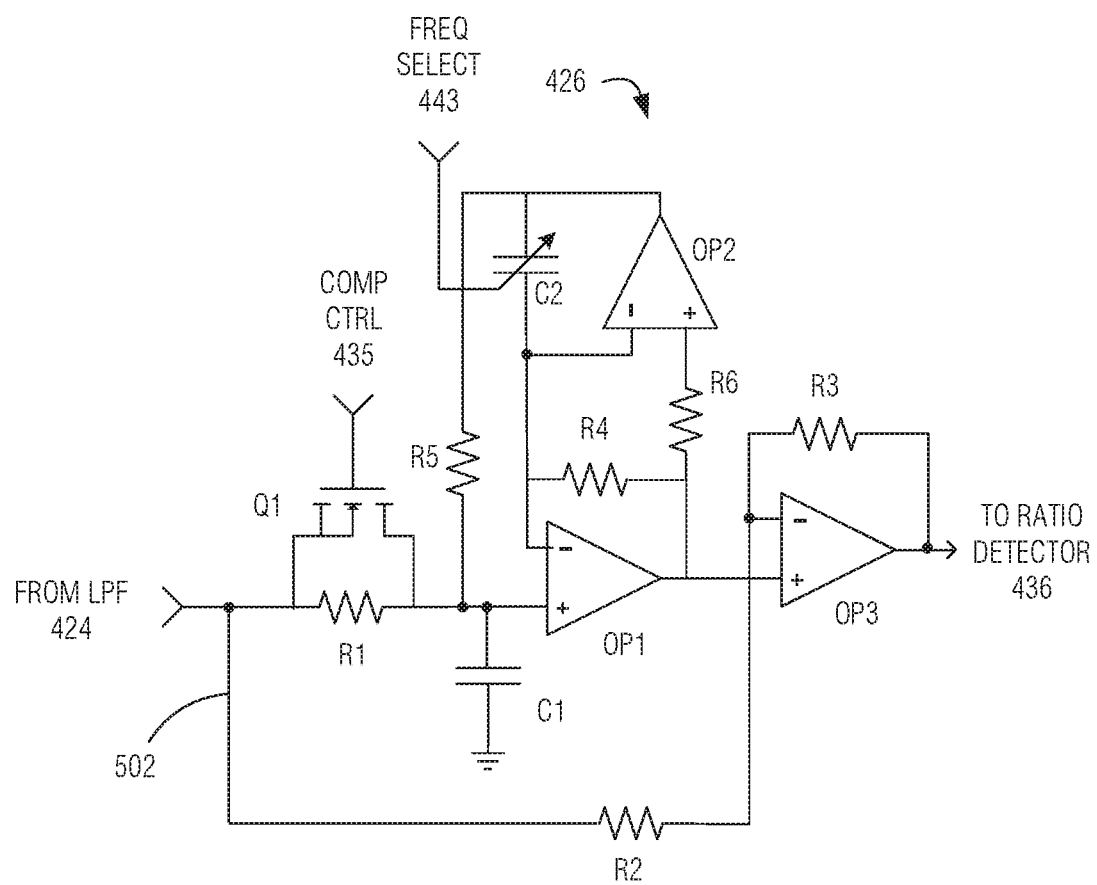
FIG. 5 is a schematic diagram illustrating a signal conditioning arrangement of the receiver circuit portion of FIG. 4 according to an example embodiment.

FIG. 5 is a schematic diagram illustrating signal conditioning arrangement 426 in greater detail according to an example embodiment. Input node 502 is coupled to the output of low-pass filter 424. Compensation control signaling 435 is provided to gate of transistor Q1, which is configured to operate as a variable-resistance transmission gate. Together with resistor R1 and capacitor C1, the variable-resistance transmission gate of Q1 varies the time constant and quality factor Q at the non-inverting input of operational amplifier OP1.

Operational amplifiers OP1 and OP2 are arranged as a dual-amplifier bandpass resonant circuit using capacitors C1 and C2 along with the amplification gain, to perform amplification and bandpass filtering of the input signal at input node 502. Transistor Q1 controls the quality factor, Q, of the resonance characteristics of signal conditioning arrangement 426, along with a time delay. Accordingly, these components add a variable delay before the amplification stage provided by operational amplifier OP3.

In a related example, capacitor C2 is variable, and electronically controlled by frequency selection signaling 443. Adjustment of the capacitance value of capacitor C2 in this manner provides controllable variability of the frequency that is subject to delay. As an example, frequency selection signaling 443 may be supplied by DSP 442 separately to each signal conditioning arrangement 426. Thus, for instance, referring to FIG. 4, signal conditioning arrangement 426A may be tuned to a different frequency from signal conditioning arrangement 426B.

Figure 6:
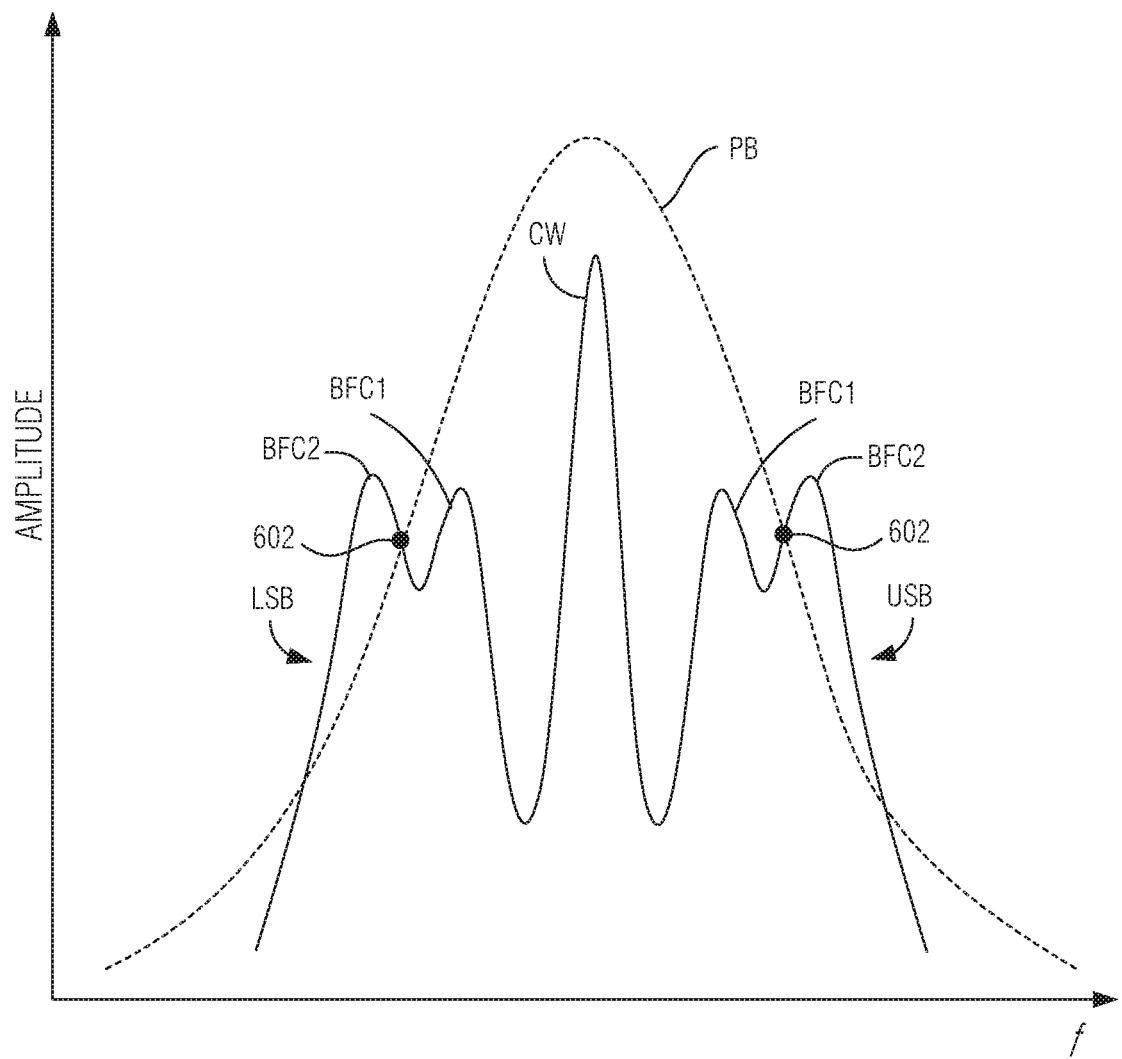
FIG. 6 is a spectrum graph illustrating a narrow pass band associated with a high-Q antenna, superimposed over frequency components of a signal to be received.

FIG. 6 is a spectrum graph illustrating a narrow pass band associated with a high-Q antenna, superimposed over frequency components of a signal to be received. The RF signal to be received may be an amplitude-modulated (AM) signal that includes carrier wave CW, lower sideband LSB, and upper sideband USB. Each sideband USB, LSB has a first baseband frequency component BFC1 and a second baseband frequency component BFC2. Pass band PB associated with the high-Q antenna has a narrow bandwidth, which may be narrower than the entire RF signal. When passing through the high-Q antenna, baseband frequency component BFC2 is attenuated to the amplitude indicated at 602. Frequency component BFC2, being located closer to the center frequency of pass band PB, is attenuated to a lesser extent, or not at all. As a result, when the RF signal is demodulated, the baseband frequency components, BFC1 and BFC2, may have different amplitudes.

Figure 7:
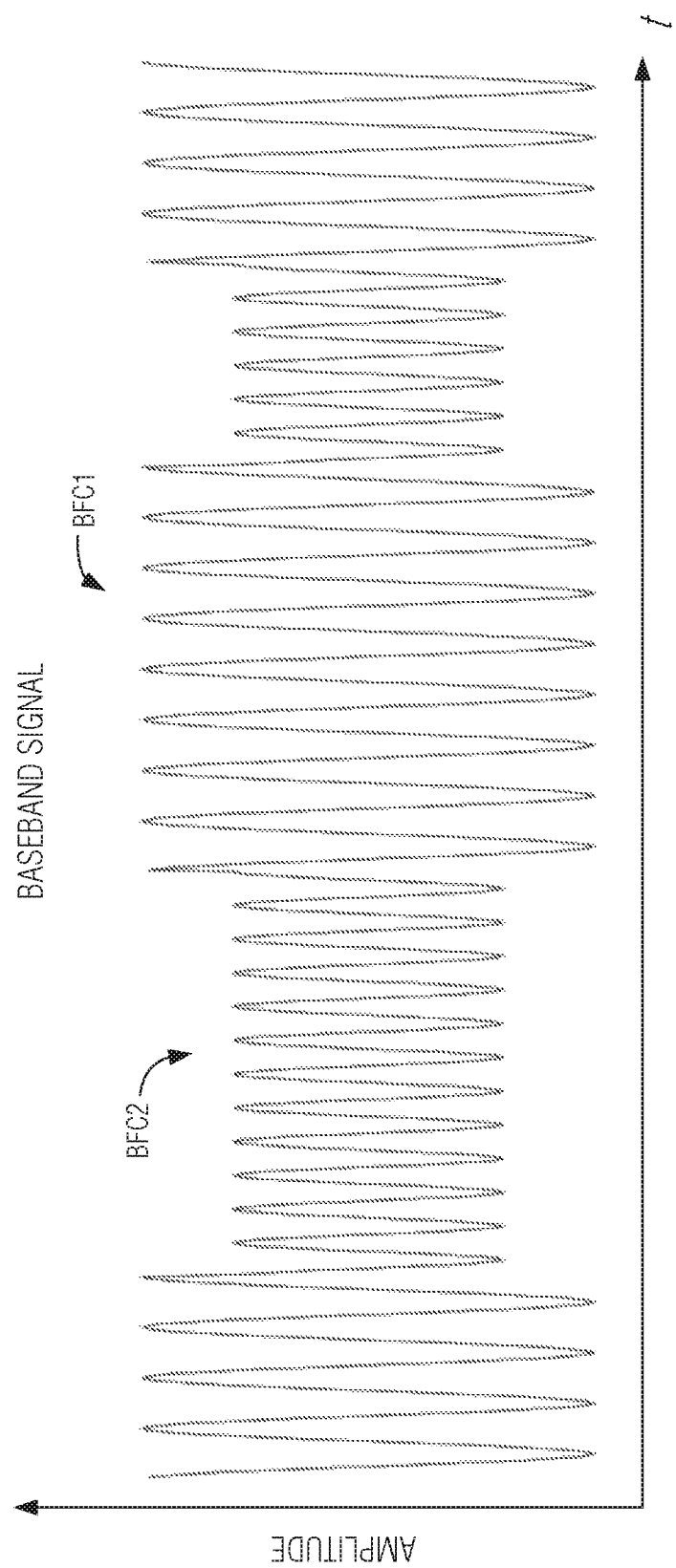
FIG. 7 is a graph illustrating frequency components having different amplitudes due to reception of the signal by a high-Q antenna.

FIG. 7 is a graph illustrating the frequency components having different amplitudes due to reception of the signal by a high-Q antenna. As shown, baseband frequency component BFC2 has a smaller amplitude than baseband frequency component BFC1. Operation of receiver circuit 204 serves, in part, to equalize these amplitudes with the application of differing amounts of gain in the receive paths. In addition, receiver circuit 204 serves to apply differing amounts of time delay to the different receive paths in order to achieve temporal alignment between baseband frequency components BFC1 and BFC2.

ADDITIONAL NOTES & EXAMPLES

Example 1 is a radio-frequency (RF) transmitter circuit comprising: a controller circuit to generate transmission control signaling; a modulator circuit to modulate a RF carrier wave having a fixed frequency with a baseband signal; a RF driver circuit to be coupled to an antenna, the RF driver circuit to amplify the modulated carrier wave for transmission via the antenna; a power control circuit to dynamically adjust supply power to the RF driver circuit in response to the transmission control signaling, wherein the supply power controls a degree of amplification applied by the RF driver circuit to control a strength of the transmission; a field sensor coupled to the antenna and configured to measure a resonance condition of the transmission; a resonance control circuit to dynamically adjust a resonance frequency of the antenna, in response to the transmission control signaling, to maintain resonance of the transmission at the fixed frequency of the carrier wave; wherein the controller circuit generates the transmission control signaling in response to a measured strength and the resonance condition of the transmission.

In Example 2, the subject matter of Example 1 includes, the antenna, wherein the antenna has a quality factor Q of at least 100.

In Example 3, the subject matter of Examples 1-2 includes, the antenna, wherein the resonance control circuit is magnetically coupled to the antenna.

In Example 4, the subject matter of Examples 1-3 includes, wherein the field sensor outputs a phase error signal for use by the controller, the phase error signal representing an extent of deviation from resonance of the transmission.

In Example 5, the subject matter of Example 4 includes, wherein the field sensor further outputs an amplitude error signal for use by the controller, the amplitude error signal representing an extent of deviation from a target amplitude of the transmission.

In Example 6, the subject matter of Examples 1-5 includes, wherein the transmission control signaling includes resonance control signaling supplied to the resonance control circuit, and power control signaling supplied to the power control circuit.

In Example 7, the subject matter of Examples 1-6 includes, wherein the controller circuit is to supply the baseband signal to the modulator circuit.

In Example 8, the subject matter of Examples 1-7 includes, wherein the RF transmitter circuit is part of a radio-frequency identification (RFID) reader device, and wherein the transmission is a RFID driving signal to activate a RFID tag.

In Example 9, the subject matter of Examples 1-8 includes, wherein the transmission control signaling includes first indicia corresponding to relatively shorter-distance transmission, and second indicia corresponding to relatively longer-distance transmission, wherein the second indicia calls for a higher supply power than supply power called for by the first indicia.

In Example 10, the subject matter of Example 9 includes, wherein the RF driver circuit is constructed to generate: at a first time, a first modulated carrier wave corresponding to the relatively shorter-distance transmission at the supply power called for by the first indicia; and at a second time, a second modulated carrier wave corresponding to the relatively longer-distance transmission at the supply power called for by the second indicia.

In Example 11, the subject matter of Examples 9-10 includes, wherein the relatively shorter-distance transmission comprises a radio-frequency identification (RFID) tag driving signal to activate a RFID tag, and wherein the relatively longer-distance transmission comprises a data-communication signal to be received by a remote receiver.

In Example 12, the subject matter of Examples 9-11 includes, wherein the higher supply power called for by the second indicia is at least 100 times greater than the supply power called for by the first indicia.

In Example 13, the subject matter of Examples 1-12 includes, wherein the power control circuit to is to dynamically adjust supply power to the RF driver circuit over a range of less than 10 V to greater than 100 V.

Example 14 is a radio-frequency (RF) transmitter circuit comprising: a controller circuit to generate transmission control signaling that includes, first indicia corresponding to relatively shorter-distance transmission, and second indicia corresponding to relatively longer-distance transmission; a modulator circuit to modulate a RF carrier wave having a fixed frequency with a baseband signal; a RF driver circuit to be coupled to an antenna, the RF driver circuit to amplify the modulated carrier wave for transmission via the antenna; a power control circuit to dynamically adjust supply power to the RF driver circuit in response to the transmission control signaling, wherein the supply power controls a degree of amplification applied by the RF driver circuit to control a strength of the transmission, wherein a relatively lower strength of transmission corresponds to the first indicia, and a relatively higher strength of transmission corresponds to the second indicia; wherein RF driver circuit is constructed to generate: at a first time, a first modulated carrier wave corresponding to the relatively shorter-distance transmission at the supply power called for by the first indicia; and at a second time, a second modulated carrier wave corresponding to the relatively longer-distance transmission at the supply power called for by the second indicia.

In Example 15, the subject matter of Example 14 includes, wherein the relatively shorter-distance transmission comprises a radio-frequency identification (RFID) tag driving signal to activate a RFID tag, and wherein the relatively longer-distance transmission comprises a data-communication signal to be received by a remote receiver.

In Example 16, the subject matter of Examples 14-15 includes, wherein the higher supply power called for by the second indicia is at least 100 times greater than the supply power called for by the first indicia.

In Example 17, the subject matter of Examples 14-16 includes, wherein the power control circuit to is to dynamically adjust supply power to the RF driver circuit over a range of less than 10 V to greater than 100 V.

In Example 18, the subject matter of Examples 14-17 includes, wherein the power control circuit to is to dynamically adjust supply power to the RF driver circuit over a range of less than 10 V to greater than 200 V.

In Example 19, the subject matter of Examples 14-18 includes, the antenna, wherein the antenna has a quality factor Q of at least 100.

In Example 20, the subject matter of Examples 14-19 includes, wherein the modulator circuit is to apply a dynamically-variable depth of modulation of the RF carrier wave based on a modulation control signal.

Example 21 is a radio frequency (RF) receiver circuit for receiving a transmitted signal, the RF receiver circuit comprising: a receive signal input; demodulator and amplification circuitry coupled to the receive signal input, the demodulator and amplification circuitry to extract a baseband signal from the transmitted signal, the baseband signal including a first baseband frequency component and a second baseband frequency component that is different from the first baseband frequency component; a multi-path signal-recovery circuitry arrangement having an input coupled to the demodulator and amplification circuitry to receive the baseband signal, and comprising a first receive path and a second receive path parallel to the first receive path, with each receive path to independently carry the baseband signal, wherein the first receive path includes, a first signal conditioning arrangement and the second receive path includes a second signal conditioning arrangement; wherein the first signal conditioning arrangement includes a first bandpass filtering tuned to the first baseband frequency component, and first controllable-gain amplification and first controllable-delay circuitry; wherein the second signal conditioning arrangement includes a second bandpass filter tuned to the second baseband frequency component; and a control loop to independently adjust at least the first controllable-gain amplification and controllable delay circuitry to increase temporal and amplitude alignment of the baseband signal between the first and the second receive paths; and a mixer circuit coupled to the first receive path and the second receive path, the mixer circuit to combine respective outputs from the first and the second receive paths to produce a corrected recovered baseband signal.

In Example 22, the subject matter of Example 21 includes, an antenna coupled to the receive signal input, wherein the antenna has a quality factor Q of at least 100.

In Example 23, the subject matter of Examples 21-22 includes, wherein the control loop includes a ratio detector to compare temporal alignment of the baseband signal in the first and the second receive paths, and to produce error signaling representing an extent of a temporal misalignment between the baseband signal in the first and the second receive paths.

In Example 24, the subject matter of Example 23 includes, wherein the control loop includes a controller to generate compensation signaling for the first controllable-delay circuitry based on the error signaling.

In Example 25, the subject matter of Examples 21-24 includes, wherein the second signal conditioning arrangement further includes a second controllable-gain amplification and second controllable-delay circuitry that are independently controllable from the first controllable-gain amplification and first controllable-delay circuitry.

In Example 26, the subject matter of Examples 21-25 includes, wherein the multi-path signal-recovery circuitry arrangement includes a first low-pass filter in the first receive path that outputs to the first signal conditioning arrangement, and a second low-pass filter in the second receive path that outputs to the second signal conditioning arrangement.

In Example 27, the subject matter of Examples 21-26 includes, wherein the demodulator and amplification circuitry provides an adjustable amplification gain, and wherein the RF receiver circuit further comprises an automatic gain controller to cause the demodulator and amplification circuitry to vary the adjustable amplification gain to achieve a target signal amplitude of the recovered baseband signal.

In Example 28, the subject matter of Examples 21-27 includes, wherein the RF receiver circuit is part of a radio-frequency identification (RFID) reader device, and wherein the transmitted signal is transmitted by a RFID tag.

In Example 29, the subject matter of Examples 21-28 includes, a processor circuit configured to measure a characteristic of an incoming signal; a signal interface coupled to the processor circuit and configured to facilitate the measurement of the characteristic of the incoming signal by the processor circuit; sense signal conditioning circuitry having a signal input, a signal output, and a gain control input, wherein the signal input is coupled to the receive signal input, the signal output is coupled to the signal interface, and the gain control input is coupled to an output of the processor circuit; the sense signal conditioning circuitry including a variable-gain amplification subcircuit configured to amplify the incoming signal at the signal input by an adjustable gain amount in response to a gain control signal at the gain control input; and wherein the processor circuit is further configured to produce the gain control signal.

In Example 30, the subject matter of Example 29 includes, wherein the characteristic of the incoming signal is signal amplitude.

In Example 31, the subject matter of Examples 29-30 includes, wherein the signal input is configured to receive a RF signal.

In Example 32, the subject matter of Examples 29-31 includes, wherein the signal input is configured to receive the transmitted signal.

In Example 33, the subject matter of Examples 29-32 includes, wherein the variable-gain amplification subcircuit is electrically configurable to a selectable gain from among a set of discrete gain settings.

In Example 34, the subject matter of Examples 29-33 includes, wherein the variable-gain amplification subcircuit includes a set of switchably-selectable impedance elements, and wherein the gain control signal selects the impedance elements.

In Example 35, the subject matter of Example 34 includes, wherein the set of switchably-selectable impedance elements are in a feedback loop of an amplifier circuit.

In Example 36, the subject matter of Examples 27-35 includes, wherein the signal interface is constructed to accept a range of amplitudes up to a maximum input limit, and wherein the processor circuit is configured to generate the gain control signal to cause the variable-gain amplification subcircuit to amplify the incoming signal to an amplitude that is between the maximum limit and one-half of the maximum limit.

In Example 37, the subject matter of Examples 27-36 includes, wherein the incoming signal is transmitted by a signal emitter, and wherein the processor circuit is configured to estimate a distance to the signal emitter based on the characteristic of the incoming signal.

Example 38 is a radio frequency (RF) receiver circuit for receiving a transmitted signal, the RF receiver circuit comprising: a receive signal input; demodulator and amplification circuitry coupled to the receive signal input, the demodulator and amplification circuitry to extract a baseband signal from the transmitted signal, the baseband signal including a first baseband frequency component and a second baseband frequency component that is different from the first baseband frequency component; a multi-path signal-recovery circuitry arrangement having an input coupled to the demodulator and amplification circuitry to receive the baseband signal, and comprising a first receive path and a second receive path parallel to the first receive path, with each receive path to independently carry the baseband signal, wherein the first receive path includes, a first signal conditioning arrangement and the second receive path includes a second signal conditioning arrangement; a processor circuit configured to measure a characteristic of an incoming signal; a signal interface coupled to the processor circuit and configured to facilitate the measurement of the characteristic of the incoming signal by the processor circuit; sense signal conditioning circuitry having a signal input, a signal output, and a gain control input, wherein the signal input is coupled to the receive signal input, the signal output is coupled to the signal interface, and the gain control input is coupled to an output of the processor circuit; the sense signal conditioning circuitry including a variable-gain amplification subcircuit configured to amplify the incoming signal at the signal input by an adjustable gain amount in response to a gain control signal at the gain control input; and wherein the processor circuit is further configured to produce the gain control signal.

In Example 39, the subject matter of Example 38 includes, an antenna coupled to the receive signal input, wherein the antenna has a quality factor Q of at least 100.

In Example 40, the subject matter of Examples 38-39 includes, wherein the characteristic of the incoming signal is signal amplitude.

In Example 41, the subject matter of Examples 38-40 includes, wherein the signal input is configured to receive a RF signal.

In Example 42, the subject matter of Examples 38-41 includes, wherein the signal input is configured to receive the transmitted signal.

In Example 43, the subject matter of Examples 38-42 includes, wherein the variable-gain amplification subcircuit is electrically configurable to a selectable gain from among a set of discrete gain settings.

In Example 44, the subject matter of Examples 38-43 includes, wherein the variable-gain amplification subcircuit includes a set of switchably-selectable impedance elements, and wherein the gain control signal selects the impedance elements.

In Example 45, the subject matter of Example 44 includes, wherein the set of switchably-selectable impedance elements are in a feedback loop of an amplifier circuit.

In Example 46, the subject matter of Examples 38-45 includes, wherein the signal interface is constructed to accept a range of amplitudes up to a maximum input limit, and wherein the processor circuit is configured to generate the gain control signal to cause the variable-gain amplification subcircuit to amplify the incoming signal to an amplitude that is between the maximum limit and one-half of the maximum limit.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A radio frequency (RF) receiver circuit for receiving a transmitted signal, the RF receiver circuit comprising:
   a receive signal input;
   demodulator and amplification circuitry coupled to the receive signal input, the demodulator and amplification circuitry to extract a baseband signal from the transmitted signal, the baseband signal including a first baseband frequency component and a second baseband frequency component that is different from the first baseband frequency component;
   a multi-path signal-recovery circuitry arrangement having an input coupled to the demodulator and amplification circuitry to receive the baseband signal, and comprising a first receive path and a second receive path parallel to the first receive path, with each receive path to independently carry the baseband signal, wherein the first receive path includes a first signal conditioning arrangement and the second receive path includes a second signal conditioning arrangement;
   wherein the first signal conditioning arrangement includes a first bandpass filtering tuned to the first baseband frequency component, and first controllable-gain amplification and first controllable-delay circuitry;
   wherein the second signal conditioning arrangement includes a second bandpass filter tuned to the second baseband frequency component; and
   a control loop to independently adjust at least the first controllable-gain amplification and controllable delay circuitry to increase temporal and amplitude alignment of the baseband signal between the first and the second receive paths; and
   a mixer circuit coupled to the first receive path and the second receive path, the mixer circuit to combine respective outputs from the first and the second receive paths to produce a corrected recovered baseband signal.

2. The RF receiver circuit of claim 1, further comprising an antenna coupled to the receive signal input, wherein the antenna has a quality factor Q of at least 100.

3. The RF receiver circuit of claim 1, wherein the control loop includes a ratio detector to compare temporal alignment of the baseband signal in the first and the second receive paths, and to produce error signaling representing an extent of a temporal misalignment between the baseband signal in the first and the second receive paths.

4. The RF receiver circuit of claim 3, wherein the control loop includes a controller to generate compensation signaling for the first controllable-delay circuitry based on the error signaling.

5. The RF receiver circuit of claim 1, wherein the second signal conditioning arrangement further includes a second controllable-gain amplification and second controllable-delay circuitry that are independently controllable from the first controllable-gain amplification and first controllable-delay circuitry.

6. The RF receiver circuit of claim 1, wherein the multi-path signal-recovery circuitry arrangement includes a first low-pass filter in the first receive path that outputs to the first signal conditioning arrangement, and a second low-pass filter in the second receive path that outputs to the second signal conditioning arrangement.

7. The RF receiver circuit of claim 1, wherein the demodulator and amplification circuitry provides an adjustable amplification gain, and wherein the RF receiver circuit further comprises an automatic gain controller to cause the demodulator and amplification circuitry to vary the adjustable amplification gain to achieve a target signal amplitude of the recovered baseband signal.

8. The RF receiver circuit of claim 1, wherein the RF receiver circuit is part of a radio-frequency identification (RFID) reader device, and wherein the transmitted signal is transmitted by a RFID tag.

9. The RF receiver circuit of claim 1, further comprising:
a processor circuit configured to measure a characteristic of an incoming signal;
a signal interface coupled to the processor circuit and configured to facilitate the measurement of the characteristic of the incoming signal by the processor circuit;
sense signal conditioning circuitry having a signal input, a signal output, and a gain control input, wherein the signal input is coupled to the receive signal input, the signal output is coupled to the signal interface, and the gain control input is coupled to an output of the processor circuit;
the sense signal conditioning circuitry including a variable-gain amplification subcircuit configured to amplify the incoming signal at the signal input by an adjustable gain amount in response to a gain control signal at the gain control input; and
wherein the processor circuit is further configured to produce the gain control signal.

10. A radio frequency (RF) receiver circuit for receiving a transmitted signal, the RF receiver circuit comprising:
a receive signal input;
demodulator and amplification circuitry coupled to the receive signal input, the demodulator and amplification circuitry to extract a baseband signal from the transmitted signal, the baseband signal including a first baseband frequency component and a second baseband frequency component that is different from the first baseband frequency component;
a multi-path signal-recovery circuitry arrangement having an input coupled to the demodulator and amplification circuitry to receive the baseband signal, and comprising a first receive path and a second receive path parallel to the first receive path, with each receive path to independently carry the baseband signal, wherein the first receive path includes a first signal conditioning arrangement and the second receive path includes a second signal conditioning arrangement;
a processor circuit configured to measure a characteristic of an incoming signal;
a signal interface coupled to the processor circuit and configured to facilitate the measurement of the characteristic of the incoming signal by the processor circuit;
sense signal conditioning circuitry having a signal input, a signal output, and a gain control input, wherein the signal input is coupled to the receive signal input, the signal output is coupled to the signal interface, and the gain control input is coupled to an output of the processor circuit;
the sense signal conditioning circuitry including a variable-gain amplification subcircuit configured to amplify the incoming signal at the signal input by an adjustable gain amount in response to a gain control signal at the gain control input; and
wherein the processor circuit is further configured to produce the gain control signal.

11. The RF receiver circuit of claim 10, further comprising an antenna coupled to the receive signal input, wherein the antenna has a quality factor Q of at least 100.

12. The RF receiver circuit of claim 10, wherein the characteristic of the incoming signal is signal amplitude.

13. The RF receiver circuit of claim 10, wherein the signal input is configured to receive a RF signal.

14. The RF receiver circuit of claim 10, wherein the signal input is configured to receive the transmitted signal.

15. The RF receiver circuit of claim 10, wherein the variable-gain amplification subcircuit is electrically configurable to a selectable gain from among a set of discrete gain settings.

16. The RF receiver circuit of claim 10, wherein the variable-gain amplification subcircuit includes a set of switchably-selectable impedance elements, and wherein the gain control signal selects the impedance elements.

17. The RF receiver circuit of claim 16, wherein the set of switchably-selectable impedance elements are in a feedback loop of an amplifier circuit.

18. The RF receiver circuit of claim 10, wherein the signal interface is constructed to accept a range of amplitudes up to a maximum input limit, and wherein the processor circuit is configured to generate the gain control signal to cause the variable-gain amplification subcircuit to amplify the incoming signal to an amplitude that is between the maximum limit and one-half of the maximum limit.

* * * * *